United States Patent
Jung et al.

(10) Patent No.: US 8,467,159 B2
(45) Date of Patent: Jun. 18, 2013

(54) APPARATUS AND METHOD FOR CONTROLLING A RELAY IN ELECTRIC DRIVE VEHICLE

(75) Inventors: Chang-Gi Jung, Daejeon (KR); Ju-Young Kim, Daejeon (KR); Jung-Soo Kang, Daejeon (KR); Cheol-Taek Kim, Daejeon (KR); Do-Youn Kim, Daejeon (KR)

(73) Assignee: LG Chem., Ltd., Seoul (KR)

( * ) Notice: Subject to any disclaimer, the term of this patent is extended or adjusted under 35 U.S.C. 154(b) by 70 days.

(21) Appl. No.: 12/907,350

(22) Filed: Oct. 19, 2010

(65) Prior Publication Data

US 2011/0032653 A1  Feb. 10, 2011

Related U.S. Application Data

(63) Continuation of application No. PCT/KR2010/001335, filed on Mar. 3, 2010.

(30) Foreign Application Priority Data

Mar. 3, 2009  (KR) .................... 10-2009-0018071

(51) Int. Cl.
*H02H 3/24* (2006.01)
(52) U.S. Cl.
USPC .............................. 361/23; 361/92
(58) Field of Classification Search
USPC .............. 361/109, 5, 2, 93.1, 23, 92
See application file for complete search history.

(56) References Cited

U.S. PATENT DOCUMENTS

| | | | | |
|---|---|---|---|---|
| 2,648,803 | A | * | 8/1953 | Wood .............................. 361/109 |
| 3,579,038 | A | * | 5/1971 | Backderf et al. ................. 361/44 |
| 3,968,409 | A | * | 7/1976 | Windler ......................... 361/109 |
| 7,885,043 | B2 | * | 2/2011 | Kumfer et al. .................... 361/2 |
| 8,078,331 | B2 | * | 12/2011 | Sakane ......................... 700/293 |
| 2003/0142449 | A1 | * | 7/2003 | Iwata et al. ..................... 361/58 |
| 2004/0044459 | A1 | * | 3/2004 | Wakao et al. ................... 701/69 |
| 2007/0023215 | A1 | | 2/2007 | Ueda |
| 2008/0030169 | A1 | * | 2/2008 | Kamishima et al. .......... 320/134 |
| 2008/0048617 | A1 | * | 2/2008 | Yoshida ........................ 320/132 |

FOREIGN PATENT DOCUMENTS

| | | |
|---|---|---|
| EP | 2045823 A2 | 4/2009 |
| JP | 2004-23980 A | 1/2004 |
| KR | 10-0687653 B1 | 2/2007 |
| KR | 10-0746066 B1 | 8/2007 |
| KR | 10-0747267 B1 | 8/2007 |

* cited by examiner

*Primary Examiner* — Danny Nguyen
(74) *Attorney, Agent, or Firm* — Birch, Stewart, Kolasch & Birch, LLP

(57) ABSTRACT

Disclosed is a relay control apparatus and method for electric drive vehicles. The apparatus controls turn-off of a relay operative to connect an electric drive unit with a battery pack for supplying electrical power to the electric drive unit, and comprises a current sensor for measuring and outputting a residual current flowing between the battery pack and the electric drive unit; and a controller for, in a situation requiring turn-off of the relay, receiving the measured residual current value, comparing the measured residual current value with a reference value for the residual current, and controlling to maintain the ON-state of the relay or to turn off the relay on the basis of the comparison results.
Accordingly, it prevents a relay of electric drive vehicles from being damaged due to over-current such as a surge current, at the time of turning off the relay.

9 Claims, 4 Drawing Sheets

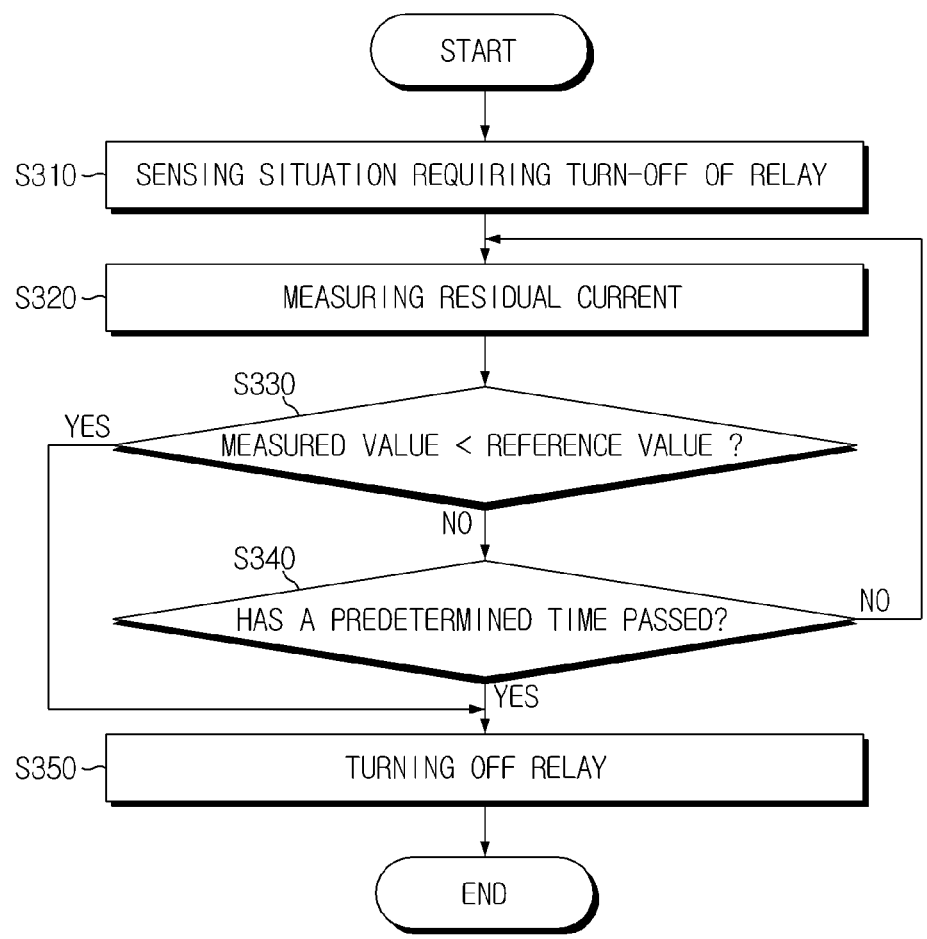

APPARATUS AND METHOD FOR CONTROLLING A RELAY IN ELECTRIC DRIVE VEHICLE

CROSS-REFERENCE TO RELATED APPLICATION

This application is a continuation of International Application No. PCT/KR2010/001335 filed on Mar. 3, 2010, which claims priority to Korean Patent Application No. 10-2009-0018071 in Republic of Korea on Mar. 3, 2009, the entire contents of which are incorporated herein by reference.

BACKGROUND OF THE INVENTION

1. Field of the Invention

The present invention relates to an apparatus and a method for controlling a relay in electric drive vehicles, and in particular, to an apparatus and a method for controlling a relay of electric drive vehicles in a situation requiring turn-off of the relay.

2. Description of the Related Art

Vehicles using fossil fuel, such as gasoline, diesel and so on, generate a lot of harmful exhaust gases and pollute the air. The harmful exhaust gas is one of factors affecting global warming and exerts an injurious effect upon global environment. To solve this problem, attempts have been made to develop vehicles reducing fossil fuel consumption or running on alternative fuel. While making such attempts, interests are centered on HEVs (Hybrid Electrical Vehicles) or EVs (Electrical Vehicles) capable of running on an electrical energy supplied from a high-capacity battery pack.

HEVs can run by a motor driven by an electrical energy supplied from a battery pack as well as by an engine consuming fossil fuel. HEVs are controlled to maximum fuel efficiency conforming to driving conditions on the basis of these two types of power sources.

At the time of applying the brake or reducing the speed of HEVs, a driving motor of HEVs is converted from a power mode to a generation mode under the control of HCU (Hybrid Control Unit). Then, the battery pack is charged with an electrical energy produced from a generator (or a driving motor) under the control of BMS (Battery Management System) connected with the HCU.

In a power mode, a driving current is applied from the battery pack to an electric drive unit such as a driving motor, to drive the vehicle or operate the electric drive unit.

In a high-voltage battery system used in large electric loads such as HEVs or the like, a high-voltage relay is turned on only when a battery is used, due to the risk of electric shock. That is to say, when the use of the battery is terminated, or when an emergency occurs such as malfunction of BMS, the relay is turned off to prevent electric shock.

However, at the time of turning off the high-voltage relay, if a residual current exists between the high-voltage battery and the driving motor, in-flow of a surge current may cause damage to the high-voltage relay. If this phenomenon is repeated many times, the high-voltage relay may break, resulting in damage or injury to vehicles or passengers.

SUMMARY OF THE INVENTION

The present invention is designed to solve the problems, and therefore, it is an object of the present invention to provide a relay control apparatus and method for preventing a high-voltage relay of electric drive vehicles from being damaged at the time of turning off the relay.

These and other objects and advantages will be apparent from the embodiments of the present invention. And, the objects and advantages of the invention may be realized by means of instrumentalities and combinations particularly pointed out in the appended claims.

To achieve the object, a relay control apparatus according to the present invention controls turn-off of a relay operative to connect an electric drive unit with a battery pack for supplying electrical power to the electric drive unit, and the apparatus comprises a current sensor for measuring and outputting a residual current flowing between the battery pack and the electric drive unit; and a controller for, in a situation requiring turn-off of the relay, receiving the measured residual current value, comparing the measured residual current value with a reference value for the residual current, and controlling to maintain the ON-state of the relay or to turn off the relay on the basis of the comparison results.

Preferably, if the measured residual current value is smaller than the reference value, the controller turns off the relay, and if the measured residual current value is larger than the reference value, the controller maintains the ON-state of the relay.

More preferably, if an ON-state maintenance time of the relay is longer than a maximum waiting time, the controller forcibly turns off the relay.

Preferably, the relay control apparatus further comprises a memory for storing the reference value for the residual current.

And, to achieve the object, a battery control system according to the present invention comprises the relay control apparatus.

Also, to achieve the object, a battery pack according to the present invention comprises the relay control apparatus.

Furthermore, to achieve the object, a relay control method according to the present invention controls turn-off of a relay operative to connect an electric drive unit with a battery pack for supplying electrical power to the electric drive unit, and the method comprises the steps of sensing a situation requiring turn-off of the relay; measuring a residual current flowing between the battery pack and the electric drive unit; comparing the measured residual current value with a reference value for the residual current; and controlling to maintain the ON-state of the relay or to turn off the relay on the basis of the comparison results.

Preferably, at the relay ON-OFF control step, if the measured residual current value is smaller than the reference value, the relay is turned off, and if the measured residual current value is larger than the reference value, the ON-state of the relay is maintained.

More preferably, at the relay ON-OFF control step, if an ON-state maintenance time of the relay is longer than a maximum waiting time, the relay is forcibly turned off.

And, preferably, the comparing step and the control step are performed by a battery control system.

And, preferably, at the step of sensing the situation requiring turn-off of the relay, a usage termination signal of the battery pack is sensed.

EFFECTS OF THE PRESENT INVENTION

According to the present invention, in case that a residual current exists between a high-voltage battery and a motor at the time of turning off a relay of electric drive vehicles, turning off the relay is not immediately carried out, but once the residual current reaches a predetermined level or lower, the relay is controlled to be turned off, so that it can reduce or eliminate the likelihood that the relay may be damaged due to over-current such as a surge current. Thereby, it can prevent accidents that may be resulted from damage of the relay and reduce the economical burden imposed due to replacement of the relay.

BRIEF DESCRIPTION OF THE DRAWINGS

The accompanying drawings illustrate the preferred embodiments of the present invention and are included to provide a further understanding of the spirit of the present invention together with the detailed description of the invention, and accordingly, the present invention should not be limitedly interpreted to the matters shown in the drawings.

FIG. 4 is a flowchart of a method for controlling turn-off of a relay in electric drive vehicles according to another embodiment of the present invention.

DESCRIPTION OF THE PREFERRED EMBODIMENT

Hereinafter, the preferred embodiments of the present invention are described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
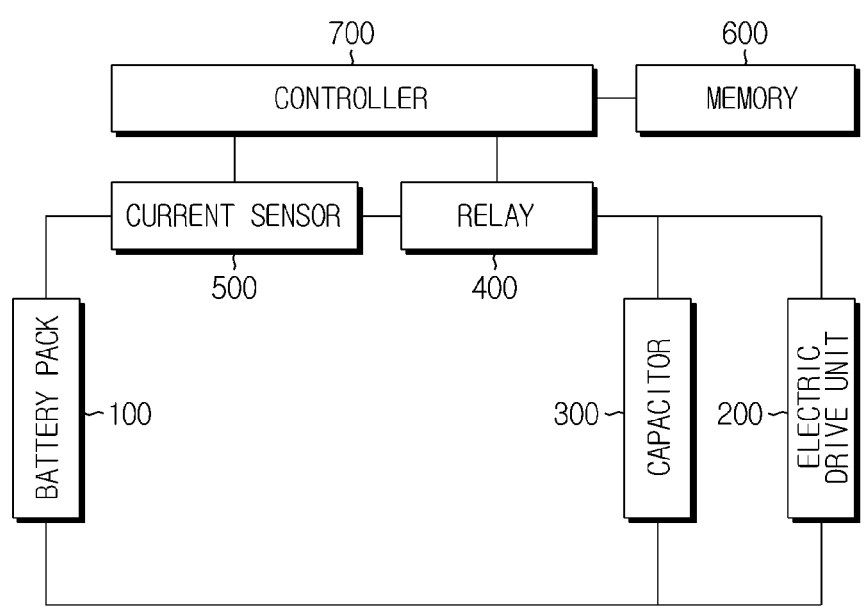
FIG. 1 is a schematic block diagram of a power supply system of electric drive vehicles, with a relay control apparatus according to a preferred embodiment of the present invention.

FIG. 1 is a schematic block diagram illustrating a power supply system of electric drive vehicles, with a relay control apparatus according to a preferred embodiment of the present invention.

Referring to FIG. 1, the relay control apparatus according to the present invention is connected to a relay 400 disposed on a transmission line of a power supply system which includes a high-voltage battery pack 100, an electric drive unit 200 and a capacitor 300. The relay control apparatus comprises a current sensor 500, a memory 600 and a controller 700.

The high-voltage battery pack 100 corresponds to a power source that is a supply of electrical power to electric drive vehicles such as HEVs, EVs or the like. The electric drive unit 200 is an electronic unit of vehicles that is operated by electrical power supplied from the high-voltage battery pack 100. The electric drive unit 200 may be various electric loads in vehicles running on electrical power supplied from the battery pack 100, or generators which charge the battery pack 100. For example, the electric drive unit 200 is a driving motor or an alternator. Alternatively, the electric drive unit 200 may be various kinds of electric drive equipments in vehicles such as an air conditioner, a head lamp and so on.

The capacitor 300 is connected with the electric drive unit 200 in parallel, and is generally called a smoothing capacitor or a link capacitor. When the electric drive unit 200 charges the battery pack 100, the capacitor 300 rectifies electrical power, and when the battery pack 100 supplies electrical power to the electric drive unit 200, the capacitor 300 limits an abrupt increase in voltage or current. The capacitor 300 executing these functions may be selected depending on specification, capacity, usage type or the like, of the battery pack 100 or the electric drive unit 200.

The relay control apparatus according to the present invention controls the relay 400 in a situation requiring turn-off of the relay. Here, a situation requiring turn-off of a relay is a situation where an electric current flowing between the battery pack 100 and the electric drive unit 200 should be shut off, for example, where the usage of the battery pack 100 is terminated, where malfunction of another control device occurs, where a durability test is carried out, where an ignition-off signal of vehicles is sensed or a noisy signal of an ignition key is sensed, and so on.

The current sensor 500 measures a residual current flowing between the battery pack 100 and the electric drive unit 200 in a situation requiring turn-off of the relay 400. Although FIG. 1 shows that the current sensor 500 is installed between the battery pack 100 and the electric drive unit 200, it is just an exemplary embodiment and the present invention is not limited in this regard. That is, the current sensor 500 may be installed anywhere if a residual current flowing between the battery pack 100 and the electric drive unit 200 can be measured.

The memory 600 stores a reference value for a residual current flowing between the battery pack 100 and the electric drive unit 200. Here, a reference value is a maximum level of a residual current within a range such that the relay 400 is hardly damaged even though it is turned off, or the damage is negligible, if any. It is obvious to an ordinary person skilled in the art that the reference value may vary depending on specification, capacity, usage type or the like, of the battery pack 100 or the electric drive unit 200. And, the memory 600 can store various information including an operating program of the controller 700 therein.

Meanwhile, the memory 600 may be physically separated from the controller 700, but this is just an exemplary embodiment, and the memory 600 may be physically integrated with the controller 700 and be incorporated in the controller 700.

The controller 700 receives a situation requiring turn-off of the relay 400 from another control device in electric drive vehicles. Here, another control device may be BMS, HCU or the like, however the present invention is not limited in this regard, and includes all kinds of devices capable of transmitting a situation requiring turn-off of a relay. When the controller 700 receives a situation requiring turn-off of the relay 400 from another control device, the controller 700 receives a residual current value measured by the current sensor 500, compares the measured value with a reference value stored in the memory 600, and determines whether or not to turn off the relay 400 on the basis of the comparison results.

Preferably, when the residual current value measured by the current sensor 500 is smaller than the reference value stored in the memory 600, the controller 700 turns off the relay 400. This is because if the measured value is smaller the reference value, it is determined that a residual current does not exist, or if any, the residual current is not enough to damage the relay 400. On the contrary, when the measured residual current value is larger than the reference value, the controller 700 does not immediately turn off the relay 400 but maintains the ON-state of the relay 400. In this case, if the controller 700 immediately turns off the relay 400, the relay 400 may be damaged due to a surge current.

More preferably, when the measured residual current value is larger than the reference value stored in the memory 600, the controller 700 forcibly turns off the relay 400 after a predetermined time (maximum waiting time) passes since the controller 700 sensed a situation requiring turn-off of the relay 400. That is, when the measured residual current value is larger than the reference value, the controller 700 maintains the ON-state of the relay 400 temporarily, but after a predetermined time (maximum waiting time) passes, forcibly turns off the relay 400. This is because even though the measured residual current value is more than a predetermined value, if the relay 400 is left in the ON-state all the way, severe accidents such as electric shock may take place. Thus, even if the measured residual current value is larger than the reference value, it is preferred to turn off the relay 400 after a predetermined time passes so as to reduce or eliminate the likelihood that subsequent problems may occur. In this case, the predetermined time may vary depending on specification, capacity, usage type or the like, of the battery pack 100 or the electric drive unit 200, and be pre-stored in the memory 600.

Meanwhile, a battery control system according to the present invention may comprise the above-mentioned relay control apparatus. Here, the battery control system generally controls a charging/discharging operation of the battery pack 100, and may be a battery management system (BMS). Thus, the controller 700, the memory 600 and the current sensor 500 may be included in the battery control system. However, the present invention is not limited in this regard, and the relay control apparatus may be separate from the battery control system. And, the relay control apparatus may be separately provided outside of the battery pack 100.

The battery pack 100 according to the present invention may comprise the above-mentioned relay control apparatus. In this instance, the battery pack 100 may further comprise a battery cell assembly including at least one battery cell, and a housing for receiving the battery cell assembly and the relay control apparatus therein.

Figure 2:
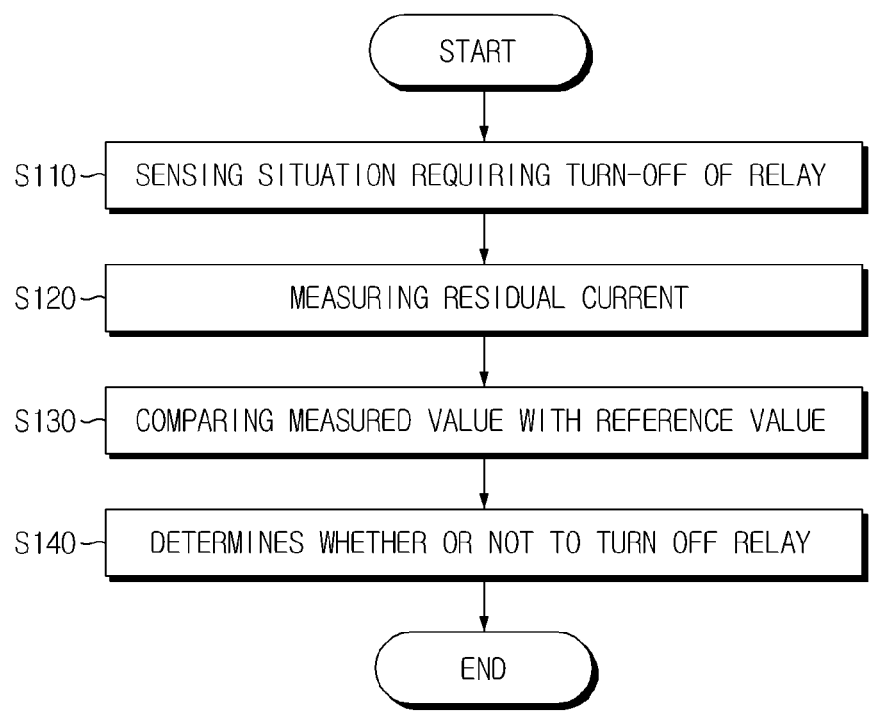
FIG. 2 is a flowchart of a relay control method by the relay control apparatus according to an embodiment of the present invention.

FIG. 2 is a flowchart of a relay control method by the relay control apparatus according to an embodiment of the present invention.

Referring to FIGS. 1 and 2, first, when the controller 700 senses a situation requiring turn-off of the relay 400 (S110), the controller 700 controls the current sensor 500 to measure a residual current flowing between the battery pack 100 and the electric drive unit 200 (S120). Here, the step S110 includes a step of sensing a usage termination signal of the battery pack 100. Next, the controller 700 compares the measured residual current value with a reference value stored in the memory 600 (S130). Then, the controller 700 determines whether or not to turn off the relay 400, on the basis of the comparison results (S140). Preferably, if the measured value is smaller than the reference value at the step S140, the controller 700 turns off the relay 400, and if the measured value is larger than the reference value, the controller 700 maintains the ON-state of the relay 400. Additionally, even though the measured value is larger than the reference value at the step S140, the controller 700 determines if a predetermined time has passed since the situation requiring turn-off of the relay 400 was sensed, and in case that the predetermined time has passed, the controller 700 turns off the relay 400. Meanwhile, the steps S130 and S140 may be performed by a battery control system.

Figure 3:
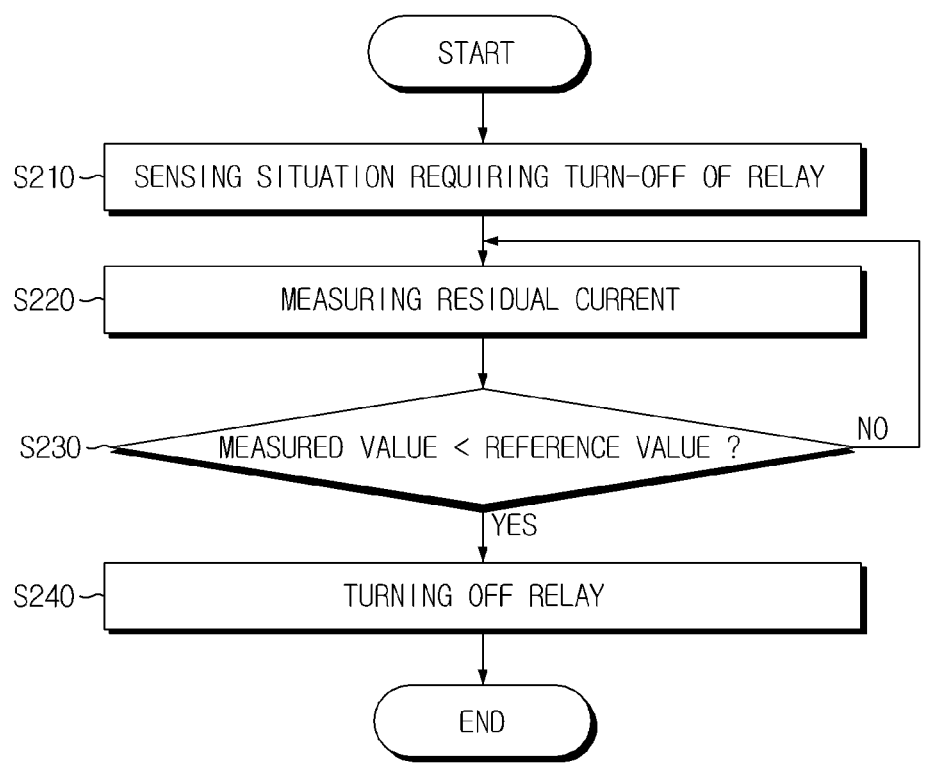
FIG. 3 is a flowchart of a method for controlling turn-off of a relay in electric drive vehicles according to an embodiment of the present invention.

FIG. 3 is a flowchart of a method for controlling turn-off of a relay in electric drive vehicles according to an embodiment of the present invention.

Referring to FIGS. 1 and 3, first, when the controller 700 senses a situation requiring turn-off of the relay 400 (S210), the controller 700 controls the current sensor 500 to measure a residual current flowing between the battery pack 100 and the electric drive unit 200 (S220). Next, the controller 700 compares the measured residual current value with a reference value stored in the memory 600 (S230). If the measured value is smaller than the reference value, the controller 700 normally turns off the relay 400 (S240). If the measured value is larger than the reference value, the controller 700 does not turn off the relay 400, but maintains the ON-state of the relay 400, and in this state, the controller 700 controls the current sensor 500 to measure a residual current flowing between the battery pack 100 and the electric drive unit 200 again (S220). As long as the measured value is larger than the reference value, the steps S220 and S230 are periodically repeated. That is, if the measured value is larger than the reference value, the ON-state of the relay 400 is maintained.

FIG. 4 is a flowchart of a method for controlling turn-off of a relay in electric drive vehicles according to another embodiment of the present invention.

Referring to FIGS. 1 and 4, first, when the controller 700 senses a situation requiring turn-off of the relay 400 (S310), the controller 700 controls the current sensor 500 to measure a residual current flowing between the battery pack 100 and the electric drive unit 200 (S320). Next, the controller 700 compares the measured residual current value with a reference value stored in the memory 600 (S330). If the measured value is smaller than the reference value, the controller 700 normally turns off the relay 400 (S350). If the measured value is larger than the reference value, the controller 700 does not turn off the relay 400, and determines if a predetermined time has passed since the situation requiring turn-off of the relay 400 was sensed (S340). In case that it is determined a predetermined time has passed since the situation requiring turn-off of the relay 400 was sensed, the controller 700 turns off the relay 400 (S350). On the contrary, in case that it is determined a predetermined time has not passed, the controller 700 controls the current sensor 500 to measure a residual current flowing between the battery pack 100 and the electric drive unit 200 again (S320) while maintaining the ON-state of the relay 400, and compares the measured value with a reference value. In accordance with the above-mentioned embodiment, even though the measured residual current value is larger than the reference value, a relay turn-off process should follow the maximum waiting time conditions. Thereby, it prevents problems that may occur in case a relay is not turned off for a long time despite the relay should be turned off.

Meanwhile, it is obvious to an ordinary person skilled in the art that each constituent element described throughout the specification means a logical constituent unit, but does not necessarily mean a physically separable constituent element.

Hereinabove, the present invention is described with reference to the limited embodiments and drawings. However, the description proposed herein is just a preferable example for the purpose of illustrations only, not intended to limit the scope of the invention, so it should be understood that other equivalents and modifications could be made thereto without departing from the spirit and scope of the invention.

What is claimed is:

1. A relay control apparatus for controlling turn-off of a relay operative to connect an electric drive unit with a battery pack for supplying electrical power to the electric drive unit, the apparatus comprising:

a current sensor for measuring and outputting a residual current flowing between the battery pack and the electric drive unit; and a controller for receiving a situation requiring turn-off of the relay, receiving the measured residual current value, comparing the measured residual current value with a reference value for the residual current, and controlling to maintain the ON-state of the relay or to turn off the relay on the basis of the comparison results, wherein if the measured residual current value is smaller than the reference value, the controller turns off the relay, and if the measured residual current value is larger than the reference value, the controller maintains the ON-state of the relay.

2. The relay control apparatus according to claim 1,
wherein if an ON-state maintenance time of the relay is longer than a maximum waiting time, the controller forcibly turns off the relay.

3. The relay control apparatus according to claim 1, further comprising:
a memory for storing the reference value for the residual current.

4. A battery control system, comprising the relay control apparatus defined in claim 1.

5. A battery pack, comprising the relay control apparatus defined in claim 1.

6. A relay control method for controlling turn-off of a relay operative to connect an electric drive unit with a battery pack for supplying electrical power to the electric drive unit, the method comprising:
sensing a situation requiring turn-off of the relay;
measuring a residual current flowing between the battery pack and the electric drive unit;
comparing the measured residual current value with a reference value for the residual current; and
controlling to maintain the ON-state of the relay or to turn off the relay on the basis of the comparison results,
wherein, at the relay ON-OFF control step, if the measured residual current value is smaller than the reference value, the relay is turned off, and if the measured residual current value is larger than the reference value, the ON-state of the relay is maintained.

7. The relay control method according to claim 6,
wherein, at the relay ON-OFF control step, if an ON-state maintenance time of the relay is longer than a maximum waiting time, the relay is forcibly turned off.

8. The relay control method according to claim 6,
wherein the comparing step and the control step are performed by a battery control system.

9. The relay control method according to claim 6,
wherein at the step of sensing the situation requiring turn-off of the relay, a usage termination signal of the battery pack is sensed.

* * * * *